United States Patent [19]

Munroe

[11] 4,300,535
[45] Nov. 17, 1981

[54] SOLAR HOT WATER COLLECTOR

[75] Inventor: Ronald G. Munroe, Georgetown, S.C.

[73] Assignee: Skyronics Aviation Inc., Georgetown, S.C.

[21] Appl. No.: 101,754

[22] Filed: Dec. 10, 1979

[51] Int. Cl.$^3$ .................................................. F24J 3/02
[52] U.S. Cl. ..................................... 126/432; 126/450; 126/DIG. 2; 126/444; 52/528
[58] Field of Search ......................... 126/450, 445–449, 126/432, DIG. 2; 52/528; 248/237; 29/526 R

[56] References Cited

U.S. PATENT DOCUMENTS

| | | | |
|---|---|---|---|
| 2,917,817 | 12/1959 | Tabor | 126/901 |
| 3,949,732 | 4/1976 | Reines | 126/432 |
| 4,060,072 | 11/1977 | Johnson | 126/448 |
| 4,142,513 | 3/1979 | Auger | 126/432 |
| 4,170,222 | 10/1979 | Barker | 126/450 |

FOREIGN PATENT DOCUMENTS 1023132 3/1953 France ................................ 126/432

Primary Examiner—James C. Yeung
Attorney, Agent, or Firm—Kirschstein, Kirschstein, Ottinger & Cobrin

[57] ABSTRACT

A hot water collector to be erected on the sloped roof of an enclosure so that solar energy, i.e. the rays of the sun, will shine on the collector and heat water flowing therein. The collector features a plurality of parallel generally rectilinear channels arranged on the roof, extending transversely to the pitch of the roof and extending horizontally and transversely across the sloped roof. Water flows from one end of a channel to the other and then down to the next lower channel. The water is heated by the sun as it flows along successive channels, and heated water is removed from the lowest channel for space heating or other uses. A specific configuration of solar hot water collector consisting of an elongated metal strip and a plurality of metal mounting brackets is also disclosed, as well as a method of installing a solar hot water collector on the sloped roof of an enclosure using a plurality of elongated metal strips.

19 Claims, 34 Drawing Figures

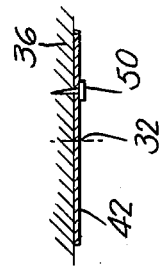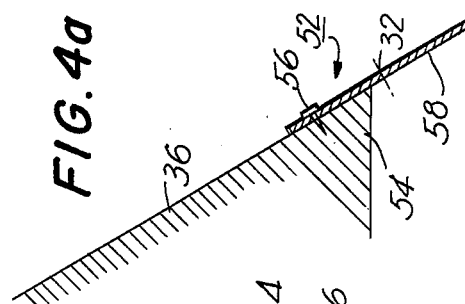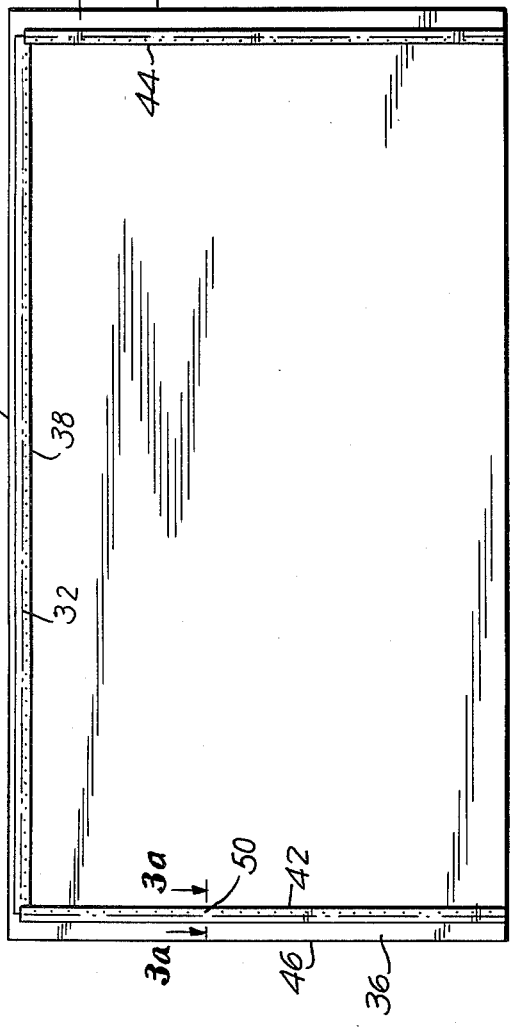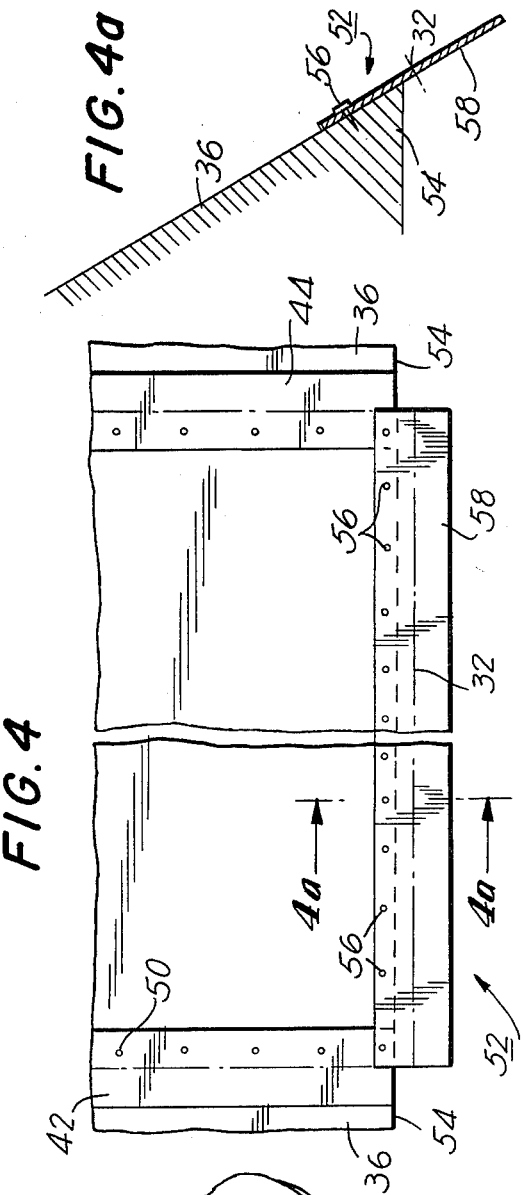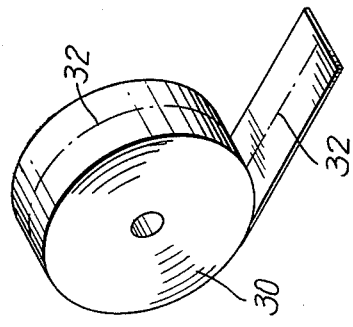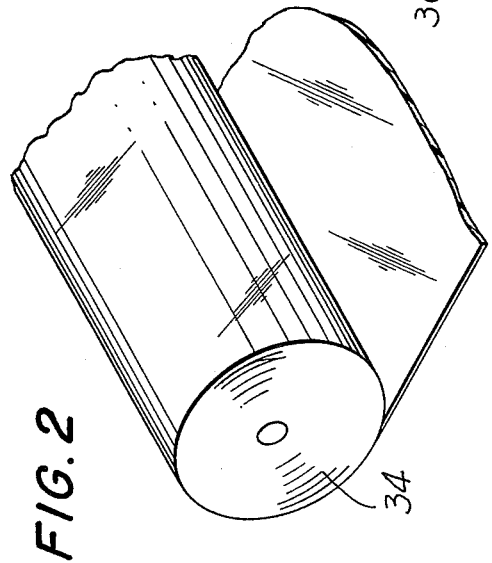

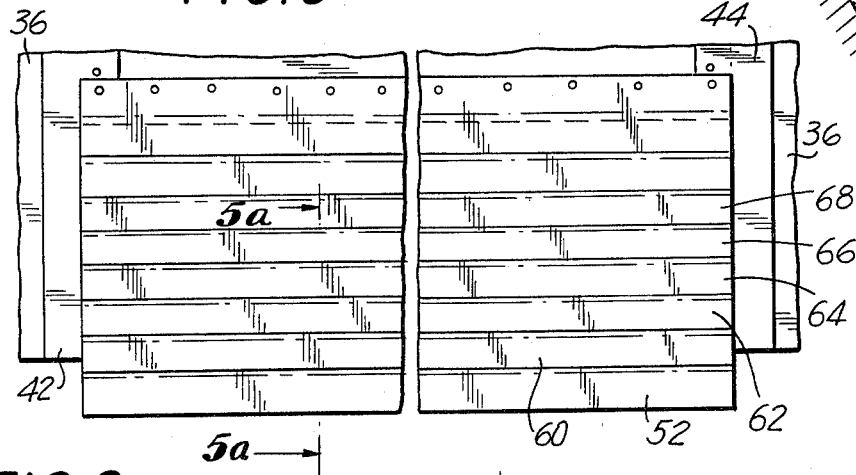
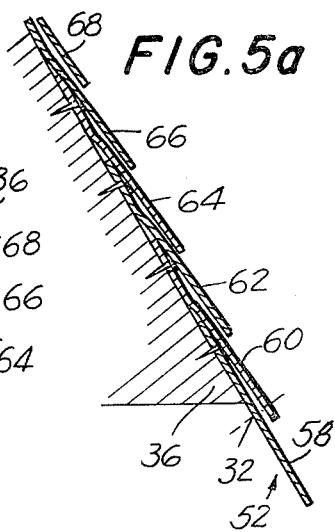
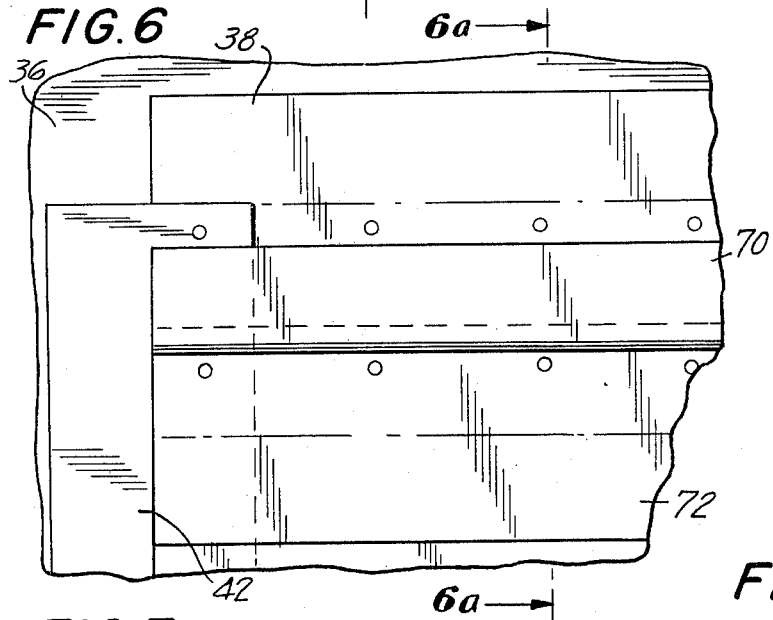
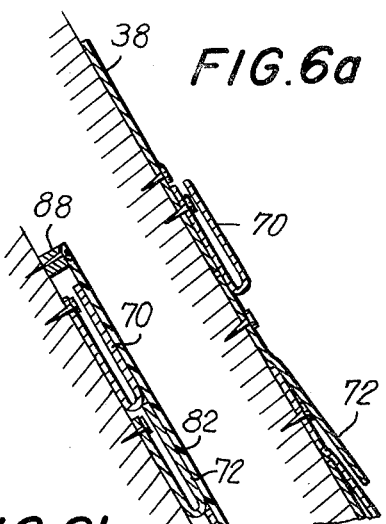
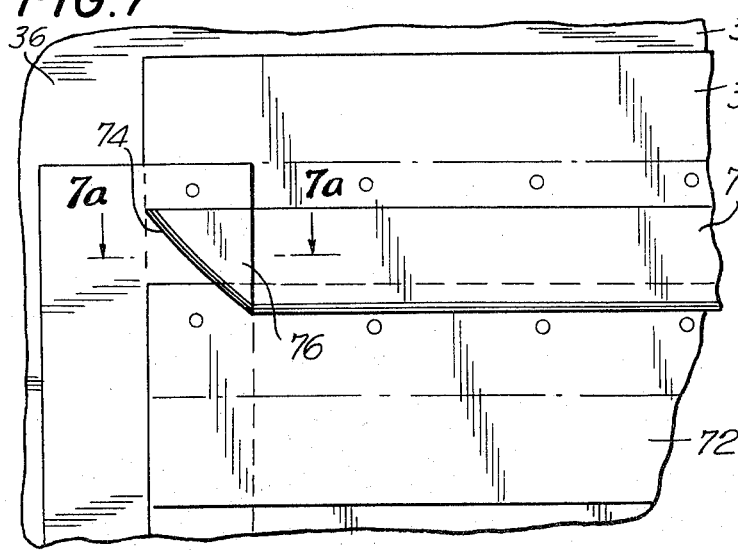
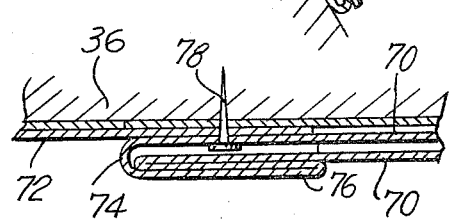

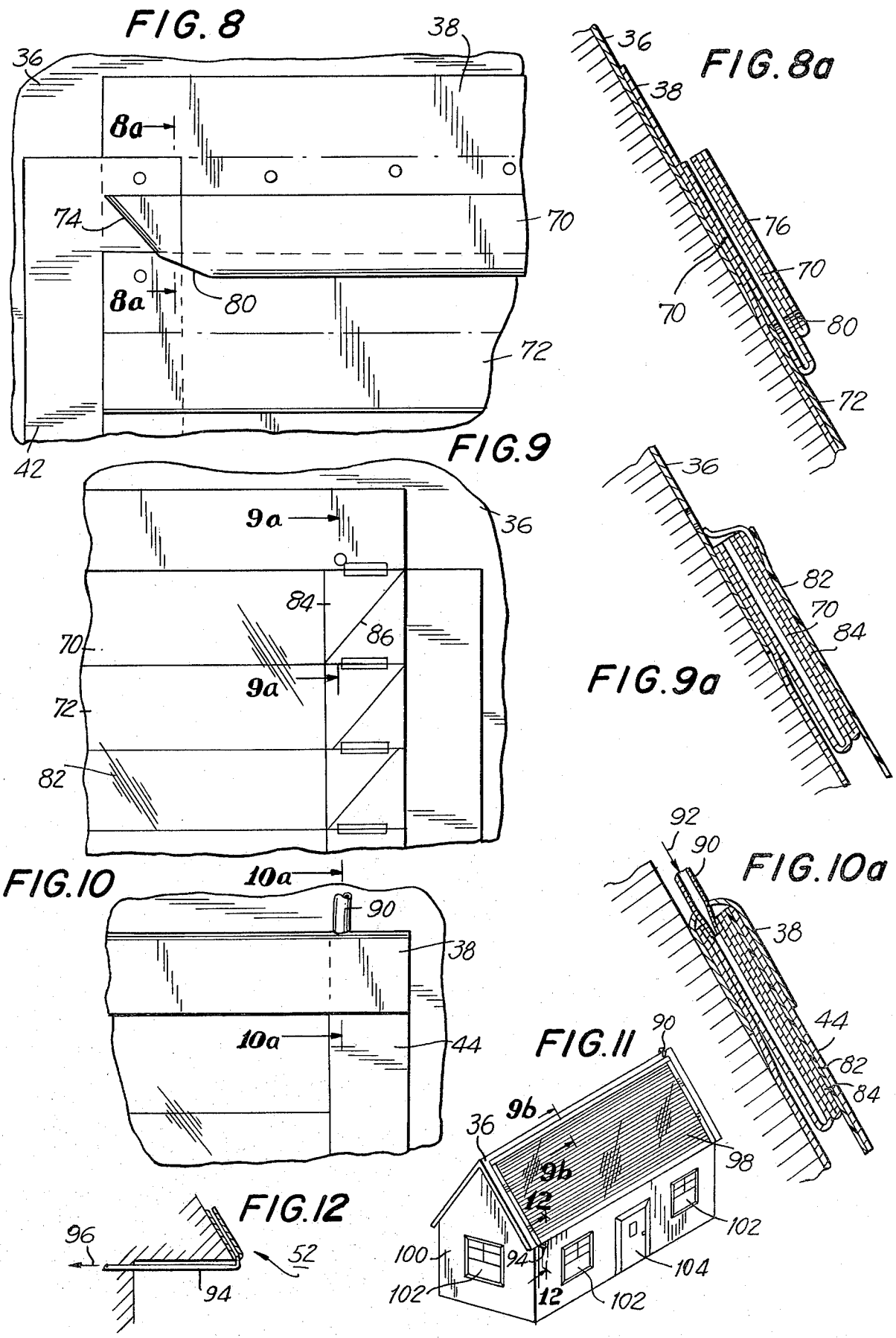

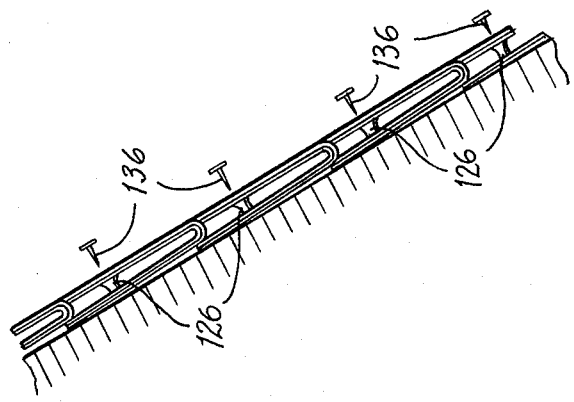
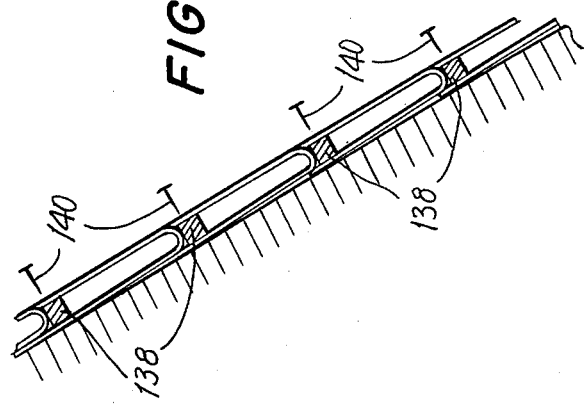
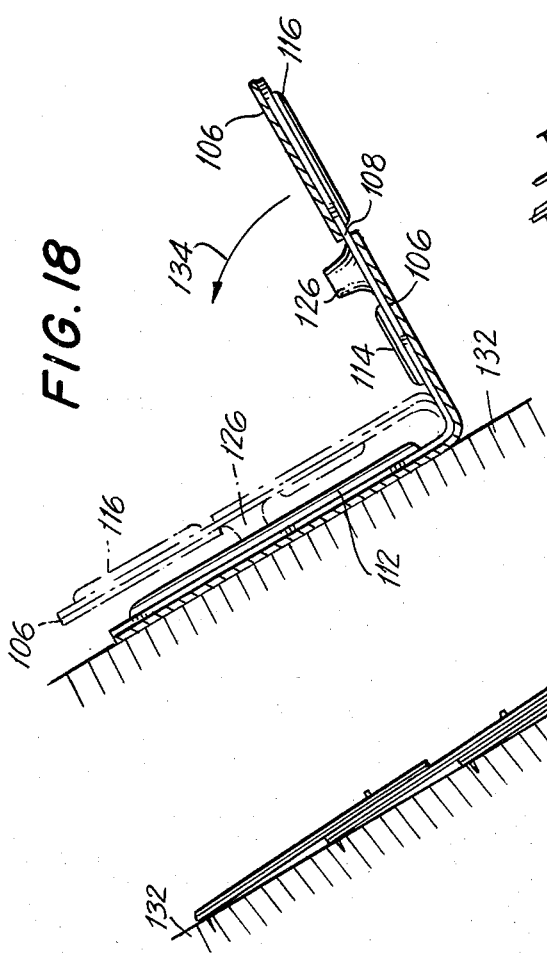
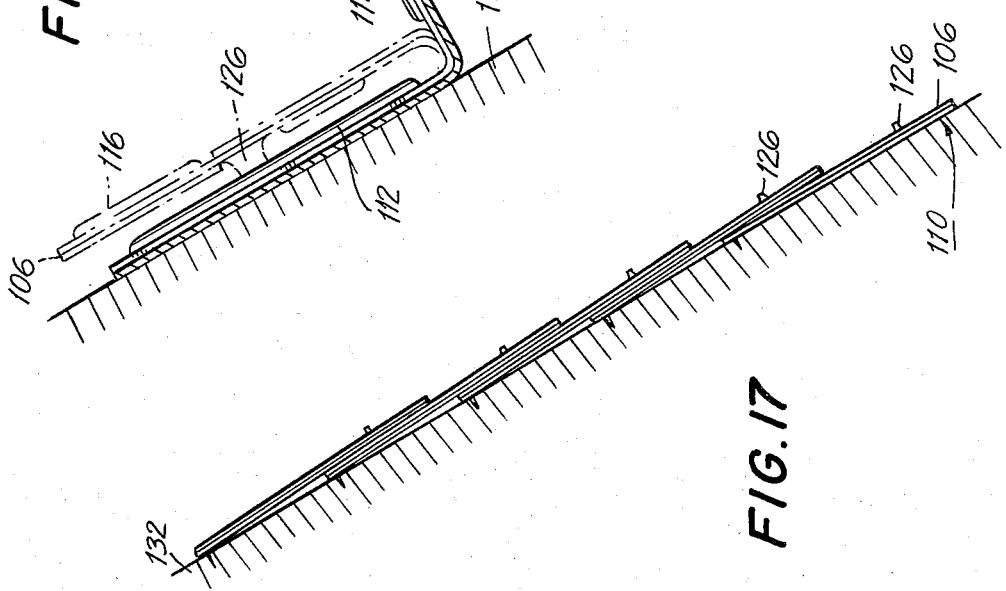

FIG. 23
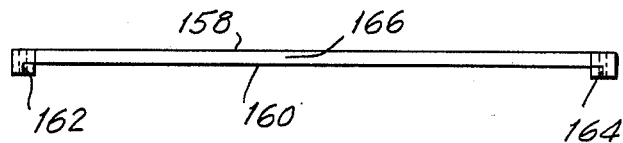
FIG. 24
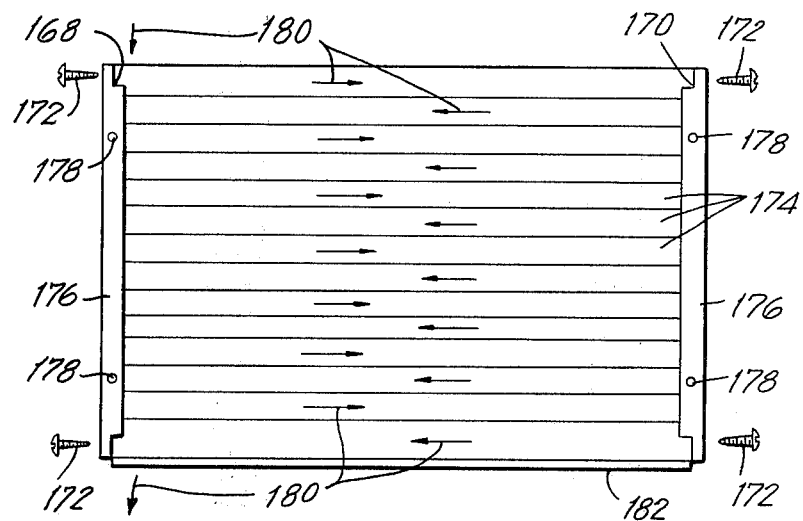
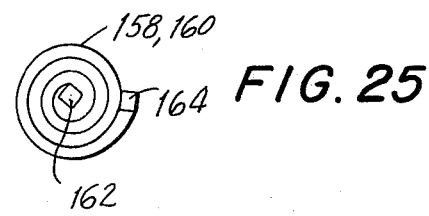
FIG. 25

SOLAR HOT WATER COLLECTOR

BACKGROUND OF THE INVENTION

1. Field of the Invention

A solar energy hot water generator and collector which is mounted on the sloped roof of an enclosure and employs the rays of the sun to heat water for useful purposes.

2. Description of the Prior Art

In recent years, the energy crises due to periodic shortages of oil has resulted in considerably greater interest in alternative sources of energy. Among the most promising of these is a solar energy, since the energy source (the rays of the sun) is abundant and free of cost, and further since no costly or scarce raw material is consumed when energy is recovered from the sun, which is an inexhaustable and constant source of energy. Thus, in recent years solar energy has been used to heat homes and for other space heating usages in enclosures. A commercial installation in the California desert generates viable quantities of electricity from sunlight using solar cells. Extremely high temperatures can be generated by concentrating the sun's rays using lenses, and commercial facilities in metallurgy and elsewhere do in fact employ the concentrated rays of the sun to heat and/or fuse materials.

In general, space heating via solar energy relies on installations which are disposed on the roofs of dwellings or other enclosures, and the basic concept employed is to heat a circulating fluid by exposure of the fluid within a transparent passage or channel to the sun's rays, so that the fluid absorbs heat from the rays of the sun on the roof. The heated fluid is then circulated through pipes, radiators or the like within the enclosure, whereby the fluid is cooled and the air within the enclosure is heated. The cooled fluid is then again circulated on the roof of the enclosure. The usual fluid employed is water, however alternative fluids such as Dowtherm, ethylene glycol, methyl alcohol, a Freon, or the like may be used in suitable instances. Sometimes air is the fluid, which is either circulated or simply heated and then discharged within the enclosure.

Among the abundance of prior art relative to solar energy collectors and solar hot water heater systems may be mentioned U.S. Pat. Nos. 4,156,419; 4,114,597; 4,111,188; 4,111,185; 4,108,155; 4,098,260; 4,093,024; 4,082,080; 4,029,080 and 3,893,506.

SUMMARY OF THE INVENTION

1. Purposes of the Invention

It is an object of the present invention to provide an improved solar hot water collector and method of making same.

Another object is to recover solar energy in an improved manner.

A further object is to provide a solar hot water collector which is inexpensive, simple and readily installed by homeowners and other laymen.

An additional object is to provide an improved solar hot water collector which concomitantly produces heated air via solar energy.

Still another object is to provide a channel-type solar hot water collector which is easily assembled and installed and which does not require the services of skilled craftsmen for installation.

Still a further object is to provide a solar hot water collector which may be sold as a package unit, particularly as a roll which is unwound and cut into rectilinear strips constituting channels.

Still an additional object is to supply a low cost, light weight, readily available solar collector panel.

An object is to provide a solar hot water collector having gravity powered alternate back and forth travel of the water to prolong the time duration of the water contact with the heated solar collector.

An object is to provide a solar hot water collector in which the water volume is made to travel in a thin sheet so that a greater surface area of the water is in contact with the solar heated metal, e.g. aluminum.

An object is to provide a solar hot water collector featuring simple construction of the channels by folding aluminum strips cut from coiled stock.

An object is to provide a solar hot water collector having channels sealed to each other with tape, so that the one collector can be used for heating either water, air or both; the hot air being forced through the collector from the bottom to the top, opposite to the water flow, by means of a blower; thus it is an object to provide a collector suitable for existing homes that have either hot water, hot air, or electric heat with central air conditioning.

An object is to provide a solar hot water collector featuring simple overall construction of the collector which lends itself to not only installation by a building contractor but also by the do-it-yourself homeowner.

An object is to provide a solar hot water collector which substitutes for conventional roof shingles thus providing an additional savings, but which also could be constructed on top of an existing roof.

An object is to provide a solar hot water collector in which the basic component is continuously coiled aluminum, so that the anodizing process, line printing, or crease forming can also be done continuously, automatically and for no additional cost.

An object is to provide a solar hot water collector in which, because of its inventive design, no tooling is required for manufacturing or construction of the collector.

An object is to recover solar energy in an improved manner using an improved structure of solar hot water collector.

An object is to provide an improved factory manufactured collector panel unit for a solar hot water collector.

An object is to provide a solar hot water collector in which the channels are superior to prior art piping systems within a collector, in that the volume of water is spread thinly over a greater surface which is heated by the sun.

An object is to provide a solar hot water collector which is readily and simply assembled either with ordinary roofing nails or a staple gun, the only tool requirements being a hammer and shears.

An object is to provide a solar hot water collector which can be marketed in kit form and at low cost because of its simplicity.

An object is to provide a solar hot water collector in which a large volume of water comes in contact with the surface that is heated, because the channels through which the water flows back and forth are relatively thin in comparison to the area exposed to the sun, and a larger area at relatively low cost in exposed to the sun.

These and other objects and advantages of the present invention will become evident from the description which follows.

2. Brief Description of the Invention

In a first embodiment of the present invention, the collector is assembled either with ordinary roofing nails or with a staple gun. The only other tool requirements are a hammer and shears. Aluminum and transparent vinyl would be supplied in coils. The longitudinal fold point of the continuous aluminum strip would be indicated by either a printed line or preferably a factory formed crease mark, so that the aluminum would want to bend along this line.

The order of construction will now be described. Two strips of aluminum are nailed along the vertical edges of the collector area, with half of each strip extending beyond the edge of the roof or collector. Next strips are nailed horizontally from the bottom. The strips can be precut from the coil or roll to the length of the roof or collector. The first strip is nailed or stapled with its lower half extending beyond the lower edge of the roof. The rest of the roof is covered with overlapping strips, horizontally level and overlapping two to three inches below the center line of the strip underneath. When the last strip is nailed at the top of the roof, it is folded in half. Its corners are folded at 45 degrees, to form the end pockets of the channel. The lower right or left end corner of this channel is then cut with the shears, to provide the first exit point for the water. This would be the end opposite the entrance plumbing at the top of the roof. This process is repeated, forming channels out of each strip, which act as pockets for the channels above. Alternate ends are cut at the bottom, to provide exits for the water. The upper edge of each channel may be bonded to the channels above with a strip of transparent adhesive backed tape. When the last channel is formed and cut, the vinyl (transparent) insulating layer is rolled out over the entire surface. The vinyl would be precut in lenghts, or cut on the roof. The edges of this vinyl covering is then taped to the aluminum. The side vertical strips are now folded over the ends of all the channels, and nailed into place. A top strip of aluminum can then be nailed across the top of the roof, so as to enclose the top channel and top of the vinyl covering. Plumbing would be provided from the lower corner of the collector to the hot water heating system, or to a suitable storage reservoir. Such a collector could readily be marketed in kit form.

A summary of the important facets and aspects of this first embodiment of the invention will now be discussed. The invention features gravity powered alternate back and forth travel of the water, to prolong the time duration of the water contact with the heated solar collector. The water volume is made to travel in a thin sheet, so that a greater surface area of the water is in contact with the solar heated aluminum. The construction of the channels is simply by folding aluminum strips cut from coiled stock. By sealing the channels to each other with tape, the one collector could be used for heating either water, air or both. The hot air could be forced through the collector from the bottom to the top, opposite to the water flow, by means of a blower. This makes the collector suitable for existing homes that have either hot water, hot air, or electric heat with central air conditioning. The simple overall construction of the collector lends itself not only to installation by a building contractor, but also by the do-it-yourself homeowner. The collector substitutes for conventional roof shingles, providing an additional savings. The collector also could be constructed on top of an existing roof. Because the basic component is continuously coiled aluminum, the anodizing process, line printing, or crease forming can also be done continuously, automatically, and for no additional cost. Because of its inventive design, no tooling is required for manufacturing or construction of the collector. This construction of the collector features low cost and simplicity, and thus the collector is readily amenable to marketing as a product. Relative to construction variations, caulking or adhesive could be used in place of the sealing tape. A spacer lifting the vinyl insulator away from the aluminum may be provided. Because the roof itself provides the structural strength of the collector, very thin gauge aluminum can be used. The aluminum collector is a more permanent roof covering than are conventional shingles. One of the key features of the invention is that a larger volume of water comes in contact with the surfaces that is solar heated. This is because the channels through which the water flows back and forth are relatively thin in comparison to the area exposed to the sun. Also, a larger area at relatively low cost is exposed to the sun.

As opposed to a piping system within a collector, the channels are superior in that the volume of water is spread thinly over a greater surface which is heated by the sun. If the collector was used for hot air as well as or in place of hot water, the air would be forced through the channels, either from the bottom up and out the top, or from the top back and forth through the channels and out the bottom. This preferably is done with a blower creating air pressure rather than sucking the air through the channels by creating a partial vacuum with the blower. The forced air pressure is superior in that it tends to expand the channels, thus increasing the volume of air that could be forced through the collector. The channels could be sealed one against the other by means of either adhesive bonding or a strip of tape along the top edge of each channel. This sealing would only be necessary if the collector was used for hot air. For hot air heating the entire collector is sealed from the atmosphere by means of the outer transparent vinyl covering. The flexible transparent plastic covering is preferable because it is easier to work with and can be shipped in roll form. However, rigid transparent plastic or glass could be used for the outside covering of the collector. The layer of transparent plastic is put over the entire collector, raised up on some furring strips, so that there is an air gap which acts as an insulating barrier, preventing transfer of heat from the aluminum collector channels to the atmosphere. The channels are assembled one on top of each other, parallel to each other and basically level. If there is a continuous printed line on the coil stock of aluminum, this would act as a guide for positioning the next higher channel which is to be nailed to the roof. Because water seeks its own level, the water will flow out the end of the channel without the need for it being slanted.

In summary, the first embodiment of the invention entails the provision of a solar hot water collector which includes a plurality of generally rectangular channels. Each channel has a one end and an other end. The channels are arranged in approximately parallel relationship on a sloped roof of an enclosure, and the channels individually extend transversely to the pitch of the roof, and transversely across the roof in a generally horizontal direction. Thus, liquid such as water will flow from one end of a channel to the other end under the influence of gravity. The ends of the channels are approximately in mutual registration. Liquid transfer means is provided at the other end of each channel except the lowermost, for transferring liquid from such channel to the next lower channels solely by gravity. Thus, liquid will flow from one channel to the next lower adjacent channel under the influence of gravity. Means is provided to introduce a liquid, preferably water, into the highest channel. The liquid is heated by the sun as it flows along successive channels. Finally, means is provided to remove heated liquid from the lowest channel.

In a preferred embodiment, the channels are sealed against the outside atmosphere, so that they are fluid-impervious. Typically in this case, means is provided to introduce an air stream into the uppermost channel above the liquid. The air stream flows above the liquid in the channels and is heated concomitantly with the liquid. Means is provided to remove a heated air stream from the lowermost channel. In this case, all the channels are connected by lateral gas transfer means, so that the air stream flows successively through all the channels, from the highest channel to the lowest channel.

Generally the channels are composed of a metal having high heat conductivity, e.g. aluminum, magnesium, an aluminum-magnesium alloy, steel, copper, brass or bronze. Preferably the channels are composed of anodized aluminum which is usually provided with a black coating. As an alternative, the channels may be composed of aluminum provided with an external coating of paint. In this case, usually only one side of each channel is coated with paint, this one side being an external side exposed to the rays of the sun. Usually the external paint coating will be black.

In terms of the method and sequence for installing the solar hot water collector on the sloped roof of an enclosure, the first step entails fastening an elongated metal strip along each lateral pitched edge of the roof, with one side of each strip extending beyond the edge of the roof. Then, an elongated metal strip is fastened along the lower edge of the roof, with one side of the strip extending beyond the lower edge of the roof. Next, a plurality of elongated metal strips are fastened horizontally and in mutual parallel relationship onto the balance of the roof, and from the lower edge of the roof to the upper edge of the roof, each successive strip overlapping the preceding strip. Then, the uppermost horizontal strip is longitudinally folded to form a channel, followed by the folding of the lower end corners of the strip to form two end pockets in the folded strip. Then the lower portion of one of the end pockets of the strip is cut, to permit liquid flow from this strip, now a channel, downwards to the next lower channel to be formed from the next lower strip. The sequence of longitudinally folding the strips is successively repeated for the balance of the horizontal strips, seriatim from top to bottom of the roof, and end pockets are cut alternately at opposite ends of successive strips. The lateral strips disposed along each lateral pitched edge of the roof are now folded over the ends of the folded horizontal strips, and the folded lateral strips are fastened in place. Finally, means is provided to pass water into the uppermost folded horizontal strip, and means is provided to recover heat from the hot water discharged from the lowermost folded horizontal strip.

Usually a transparent insulating layer is provided over the folded strips, which insulating layer typically is a sheet of transparent plastic such as polyvinyl acetate, cellophane, nylon, an acrylic resin, polyethylene, polypropylene, polystryene, polyvinyl chloride, polyacrylonitrile, or a cellulosic. Preferably, the insulating layer is air-tight, air is circulated through the collector, and the heated air is passed into the enclosure. Usually the horizontal strips are prepared by cutting generally equal lengths from a coil or roll of metal; this coil or roll is preferably provided with a longitudinal printed line or crease mark.

In an alternative embodiment of the invention, the thin black anodized aluminum is not folded initially, but is rolled up in a standard type coil. In the rolling process, or the slitting operation, the aluminum is slit approximately one to two inches about every one or two feet along its length, the width of the material being somewhere between one foot and two feet. The narrower the aluminum strips, the greater the number of channels on a given roof area. With more channels, the water travels over the roof a greater distance, and the hotter the water will be when it exits at the bottom.

During installation, the aluminum is rolled from the coils and cut to length, according to the length of the roof to be covered.

The other two components which make up the entire solar collector are aluminum stampings and roofing nails. The key to the simple assembly, strength, low cost, and proper operation of the collector is the aluminum stampings, which are provided with the assembly kit. The stampings serve several functions. They provide strength to the thin aluminum sheets. They form the sheets so that the sheets act as water channels. They act to fasten the sheets to the roof. Finally, they provide a fast method of constructing and fastening the collector.

The shape of the stamping is shown in the Figures, as will appear infra. The stamping has formed stiffening ribs along its entire length, except where the stamping is later formed into a "U" shape to form the channel. Each stamping is inserted through one of the slits, up to an extrusion.

The strips are laid across the length of the roof, starting at the bottom. The stampings are inserted through the slits up to the extrusion. The stampings are then nailed to the roof through the two outside holes. The next strip is then laid down up to the line stamped on the stamping. The stampings are inserted in the slits and this row is nailed. The roofer works his way up to the top of the roof.

The top strip is then folded over, so the stamping forms a "U" shape. Next, the stamping is nailed down through the extrusion. Thus each row is rolled over and nailed down on top of the next above row. The roofer works his way down to the bottom of the roof, folding in alternate ends of each channel as described supra. In this way, the water flows back and forth across the entire roof as many times as there are channels. The strips are alternately extended about one foot when they are first nailed down, so as to leave room for the end fold. Because the ends are folded, the water flows back and forth in the "U" shaped channels formed by folding the stampings around so that each strip forms a channel.

In summary, a solar collector is provided that is low in cost, in that thin aluminum (black), reinforced by the stampings which act like ribs, is formed at the installation. The end result is a series of "U" shaped channels which allow the water to flow back and forth many times over the entire length of the roof. By the time the water exits at the bottom, it is well heated. This hot water can be circulated through the building or other enclosure to provide heat, or it can be stored in a reservoir for later use.

One progressive die for the support stamping is all the tooling that is required. The slits in the coiled aluminum can be made automatically, when the aluminum is cut to the desired length by the supplier. Another alternative would be to provide the roofer with a simple chisel type tool, so that he could put the slits in himself with an ordinary hammer. Another alternative to the support stamping would be to use cut lengths of wood, e.g. 1"×2" furring strip. This would not give the outside edge of the aluminum strip the support from high winds that the stamping gives. For this reason a heavier gauge aluminum coiled stock would be needed, and this would be harder to fold over into the "U" shaped channel. Using the wood strips would eliminate all tooling. The seams and final assembly nails could be covered with a strip of high quality transparent or black tape. A glass reinforced heat activated epoxy tape is preferred.

This alternative embodiment of the invention may be summarized as entailing the provision of a solar hot water collector including an elongated metal strip which is composed of a metal having high heat conductivity such as aluminum, magnesium, an aluminum-magnesium alloy, steel, copper, brass or bronze. The metal strip is provided with a plurality of spaced apart rectilinear slits or slots therein, which slits or slots are longitudinally aligned in tandem along a straight line. This alternative solar hot water collector also includes a plurality of metal mounting brackets, together with means mounting the brackets in juxtaposed registration transverse to the longitudinal axis of the metal strip. One end of each mounting bracket extends through a different one of each of the slits or slots. Means are provided for attaching the other end of each of the brackets to the roof of an enclosure, so that the metal strip extends generally horizontally across the roof. Means is provided for bending each of the brackets into a generally U-shape, so that the metal strip becomes a U-shaped trough (or channel) capable of holding a liquid such as water. Finally, means is provided adjacent the one end of each of the brackets for securing this one end in spaced relation to the other end of the bracket. It will be appreciated by those skilled in the art that this description of the alternative embodiment refers to a single trough or channel; in most instances, a plurality of parallel troughs will be provided on the roof, as will appear infra.

Thus, in most instances, the elongated metal strip is in the form of a U-shaped trough having a one end and an other end, and the U-shaped trough is one of a plurality of generally identical and rectilinear U-shaped troughs. The troughs are arranged in approximately parallel relationship on a sloped roof of an enclosure, and individually extend transversely to the pitch of the roof and transversely across the roof in a generally horizontal direction, so that liquid can and will flow from the one end of a trough to the other end under the influence of gravity. The ends of the troughs are approximately in mutual registration. Liquid transfer means is provided at the other end of each trough, except the lowermost, for transferring liquid from such trough to the next lower trough solely by gravity. Thus liquid will flow from one trough to the next lower adjacent trough under the influence of gravity. Finally, means is provided to introduce liquid into the highest trough, the liquid being heated by the sun as it flows along successive troughs, together with means to remove heated liquid from the lowest trough.

The solar hot water collector as described supra entails a method and means of applying a collector directly to a roof. Another very important alternative within the scope of the present invention is a factory manufactured collector panel unit. This embodiment of the invention supplies a low cost, light weight, readily available solar collector panel. The configuration is such that these panels could be ganged in series for hotter water, or ganged in parallel for a higher volume of water.

There are three basic elements to the manufactured collector unit, which is typically dimensioned at four feet by eight feet. One is the insulating back or main structural component. This could be plywood, or preferably molded or extruded structural polystyrene foam. The second element is the black painted aluminum channels; because it is factory fabricated, very thin aluminum can be used, even of the texture and thickness of commercial aluminum cooking foil, which is feasible but represents the lower thickness extreme. The third element is the transparent insulating cover panel. This could be rigid acrylic, or other transparent solid or flexible material. In the case of a collector panel unit, the water entry and exit ports are on the same end, so that the panels can be ganged together. In essence, the solar collector panel is an assemblage of a plurality of parallel channels in an integral unit to be mounted to the roof of an enclosure such as a dwelling, as a unit which covers a large roof area without any assembly or fabrication work on the roof.

The present invention also involves a simple manufacturing method that makes the collector easy to package and ship; thus, this is one way in which the product will be packaged and shipped. In this embodiment of the invention, in most cases the collector will be installed directly on a new or old roof; hence there is no need for the insulated support backing. This enables the entire collector to be rolled up in two sections, one inside the other. The solar collector as described supra uses a multiplicity of flat channels (black colored aluminum) made of thin material less than 0.010 inch thick. This could be constructed directly on a roof, or sold as an assembled unit typically 4 feet by 8 feet in overall dimension. The unit employed an insulated back sheet for support.

In this variation of the invention, there is provided a factory assembled collector of various sizes but without the back plate, and broken down for easy shipment. The collector could be assembled preferably to an existing roof, or to a separate structure which would provide the insulating back in either case. With this construction, the transparent top insulating layer would be made from flexible transparent plastic, e.g. vinyl, in two layers on either side of the two end support bars. These bars and the plastic are rolled up for shipment. They would act as the top and bottom members of the collector frame when it is assembled at its permanent location. The two layers of transparent plastic provide an intermediate air space between them, this acting as an excellent insulator to keep the solar heat absorbed by the black aluminum channels inside the collector.

The aluminum channels are affixed to the two side bars of the collector frame. Since the channels are made up of thin aluminum, they also can be rolled up for ease of shipment. The rolled up transparent vinyl insulators and top and bottom frame supports would be packaged inside the rolled up channels and side frame supports. This would provide a shipping package of approximately one foot square and 6, 8 or 10 feet long depending on the size of the collector.

The frame members could be wood, e.g. 2 inch by 2 inch lumber firring strips, or aluminum angle iron, or a combination of both. The final assembly of the collector on the site would be accomplished by fastening the four corners with one or two lag or machine bolts on each corner. Since the collector frame is then fastened to the roof, or to other insulating backing, the final collector would be a sound structure. It should be noted that the lower channel extends about 1 inch below the bottom of the frame. This would fit inside the upper channel of another collector, thus allowing more than one collector to be ganged in series for increased water temperature of the exiting water.

In summation, the last described variation of the present solar hot water collector has several salient advantages. It is factory manufactured and is low in cost, being easily massproduced using unskilled labor. It is light in weight. When broken down it is compact and easy to ship. It is simply and easily assembled and installed on the site. The plastic transparent sheets provide double insulation.

The invention accordingly consists in the features of construction, combination of elements, arrangement of parts, and series of steps which will be exemplified in the method and article of manufacture hereinafter described, and of which the scope of application will be indicated in the appended claims.

BRIEF DESCRIPTION OF THE DRAWINGS

In the accompanying drawings in which are shown several of the various possible embodiments of the invention:

FIG. 1 shows a roll or continuous coil of aluminum strip with central longitudinal marking, scoring, or crease mark;

FIG. 2 shows a roll of transparent plastic used as the outer insulating layer;

FIG. 3 shows the initial layout of aluminum strips on a roof in plan view;

FIG. 3a is a partial sectional elevation view taken substantially along the line 3a—3a of FIG. 3;

FIG. 4 shows the emplaced bottom horizontal strip of aluminum;

FIG. 4a is a partial sectional elevation view taken substantially along the line 4a—4a of FIG. 4 and showing the overhang of the strip;

FIG. 5 shows the roof after the initial emplacement (flat) of all of the horizontal aluminum strips;

FIG. 5a is a sectional elevation view taken substantially along the line 5a—5a of FIG. 5;

FIG. 6 shows the initial folding of the uppermost horizontal aluminum strip;

FIG. 6a is a sectional elevation view taken substantially along the line 6a—6a of FIG. 6;

FIG. 7 shows the folding of a corner of the uppermost folded strip;

FIG. 7a is a partial sectional plan view taken substantially along the line 7a—7a of FIG. 7;

FIG. 8 shows the folded corner after it has been cut to provide an opening for downwards water flow to the next lower channel;

FIG. 8a is a sectional elevation view taken substantially along the line 8a—8a of FIG. 8;

FIG. 9 shows the opposite side from the preceding Figures, with all of the strips folded to form channels and folded at the corners for appropriate water flow;

FIG. 9a is a sectional elevation view taken substantially along the line 9a—9a of FIG. 9 and showing the final corner of the uppermost channel with plastic covering in place;

FIG. 9b is similar to FIG. 9a but shows a plurality of the final channels and is taken substantially along the line 9b—9b of FIG. 11;

FIG. 10 shows an uppermost corner of the collector with means to admit water;

FIG. 10a is a sectional elevation view taken substantially along the line 10a—10a of FIG. 10;

FIG. 11 shows the final installed solar hot water collector on the sloped roof of a house;

FIG. 12 is a partial sectional elevation view taken substantially along the line 12—12 of FIG. 11 and showing a feasible means for heated water egress from the collector;

FIG. 13 shows a scored aluminum strip;

FIG. 17 shows a plurality of parallel horizontal aluminum strips in place on a sloped roof of an enclosure, with brackets emplaced;

FIG. 18 shows in full outline the partial bending of the bracket so as to fold the strip; the phantom outline in FIG. 18 shows the fully bent or folded bracket and strip;

FIG. 19 shows the mode of emplacement of nails or screws on a plurality of juxtaposed brackets and associated folded strips;

FIG. 20 shows an alternate mode of erection using firring strips instead of brackets;

FIG. 23 is an elevation view of a portion of an alternative solar hot water collector unit;

FIG. 24 is a plan view of the unitary collector panel channels prior to rolling up for shipment to the usage site for installation; and FIG. 25 shows the insulator or channels rolled up for shipment.

DETAILED DESCRIPTION OF THE PREFERRED EMBODIMENTS

Figure 13:
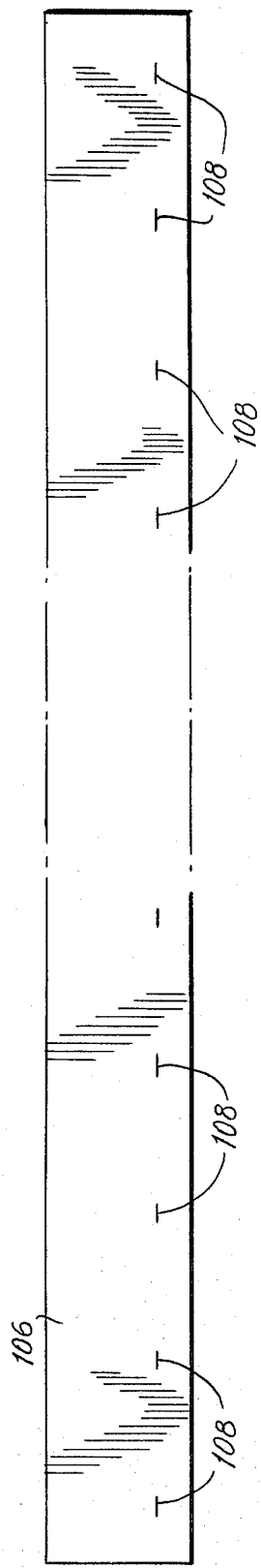
FIG. 13 et seq. are directed to alternative embodiments of the invention as described supra.

Referring now to FIGS. 1-12 inclusive, FIG. 1 shows the initial roll 30 of aluminum strip, from which substantially equal lengths of strip are cut to form the collector. The roll or continuous coil 30 is provided with an integral central longitudinal marking 32 to mark the fold line; marking 30 may alternatively be a scoring or crease mark. FIG. 2 shows the roll 34 of clear transparent plastic which may be vinyl, acrylic or any of the other plastics such as polyvinyl chloride, polyethylene, polypropylene etc. mentioned supra.

FIG. 3 shows a sloped roof 36 of an enclosure such as a dwelling i.e. a private house, a factory building, a barn or the like. An initial aluminum strip 38 has been fastened horizontally to the roof 36 near and parallel to the peak 40 of the roof 36. Lateral strips 42 and 44 are also fastened to the roof 36 along its side edges 46 and 48. FIG. 3a shows how nails such as nail 50 is used to secure the strips such as strip 42 to the roof 46.

FIG. 4 shows a lowermost horizontal strip 52 fastened to the lower horizontal edge 54 of the roof 36, via nails 56, with the crease line 32 and lower half 58 of the strip 52 extending beyond the lower edge 54 of the roof 36 (see FIG. 4a). FIGS. 5 and 5a show how the succeeding strips 62, 64, 66 and 68 are laid on and nailed to the roof 36, with the strips overlapping as shown in FIG. 5a. This laying of strips continues until the initial top strip 38 is reached.

FIGS. 6 and 6a show the initial folding of an upper strip 70 to form the first channel. The next lower strip 72 is the next to be folded. FIG. 7 shows the subsequent folding at 74 of the left side corner of the strip 70. FIG. 7a is a detail showing the folded-over portion 76 as well as a support nail 78. FIG. 8 shows the cut-away corner 80 which permits downward flow of water to the channel to be formed by the folding over of strip 72. FIGS. 9, 9a and 9b show the assemblage after a layer 82 of clear plastic derived from roll 34 has been laid over the folded-over strips (now channels), a fold portion 84 of strip 70 folded at 86 also being show; FIG. 9b shows a firring strip 88 in place as an alternate for the top of the collector and closing the channel of strip 70. FIGS. 10 and 10a show an entrance pipe 90 for admittance of cold water stream 92 into the solar hot water collector, as well as folded-over top strip 38 and lateral side strip 44. FIG. 12 shows a downspout 94 for conducting heated water stream 96 from the collector unit 98 mounted on the sloped roof 36 of the house or dwelling 100, into the house 100 and to point of use for interior space heating or for other usages. The house 100 is provided with windows 102 and door 104. The heated water is drawn from the lowermost channel derived from strip 52, as shown in FIG. 12.

Figure 14:
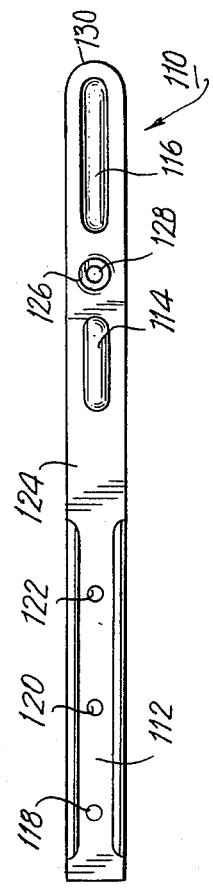
FIG. 14 is a plan view of a bracket or stamping in accordance with the alternative embodiment of the present invention.
Figure 15:
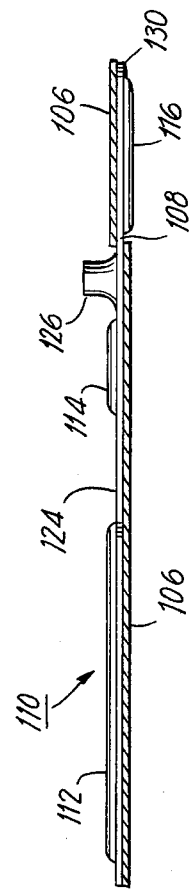
FIG. 15 shows the bracket of FIG. 14 in elevation view in conjunction with the aluminum strip of FIG. 13.
Figure 16:
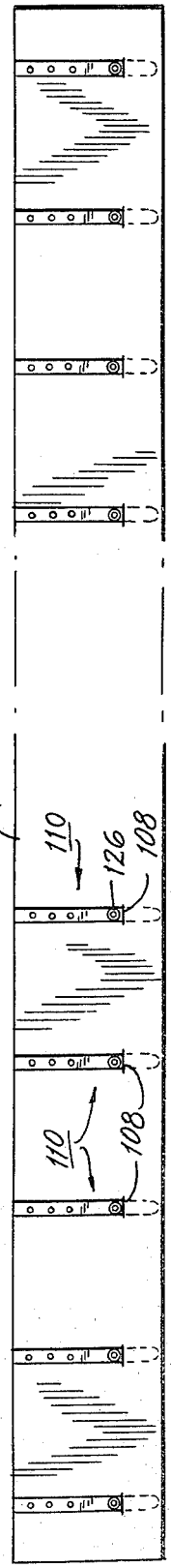
FIG. 16 shows the entire aluminum strip of FIG. 13 with a plurality of brackets emplaced.

FIG. 13 et seq show alternative embodiment of the invention. In FIG. 13, a rectilinear strip 106 is scored at 108 along its length with slits or slots. A mounting bracket 110 is shown in FIG. 14. The bracket 110 is provided with stiffening ribs 112, 114, 116 formed into the flat stamping to provide rigidity. Nail holes 118, 120, 122 are provided, and the area 124 is the bend region where a radius is formed. The extrusion 126 having a central hole 128 is for the final assembly nail. FIG. 15 shows a bracket 110 mounted to the strip 106 via slit or slot 108. FIG. 16 shows the plurality of parallel brackets such as 110, each disposed in its respective slit or slot such as 108, and mounted along the length of strip 106. Each stamping or bracket 110 extends through its respective slit or slot 108 with a lead-in 130 being provided (FIGS. 14, 15) for each bracket 110 for leading the bracket 110 into the slot 108. FIG. 17 shows the strips and stampings nailed down on a roof 132 in overlapping fashion like roof shingles. FIG. 18 shows a bracket with associated strip being bent over in the direction shown by arrow 134, to a final position as shown in phantom outline, with the extrusion 126 facing a nail hole in the stiffening rib 112. The height of the extrusion 126 determines the separation of the formed over strip 106. FIG. 19 shows the stampings folded over from the top row down and ready to be nailed through the extrusions 126 via nails 136, which are nailed through holes 128. FIG. 20 shows an alternative embodiment in which firring strips 138 are employed in place of the mounting brackets or stampings. Nails 140 are applied essentially as was the case with nails 136.

Figure 21:
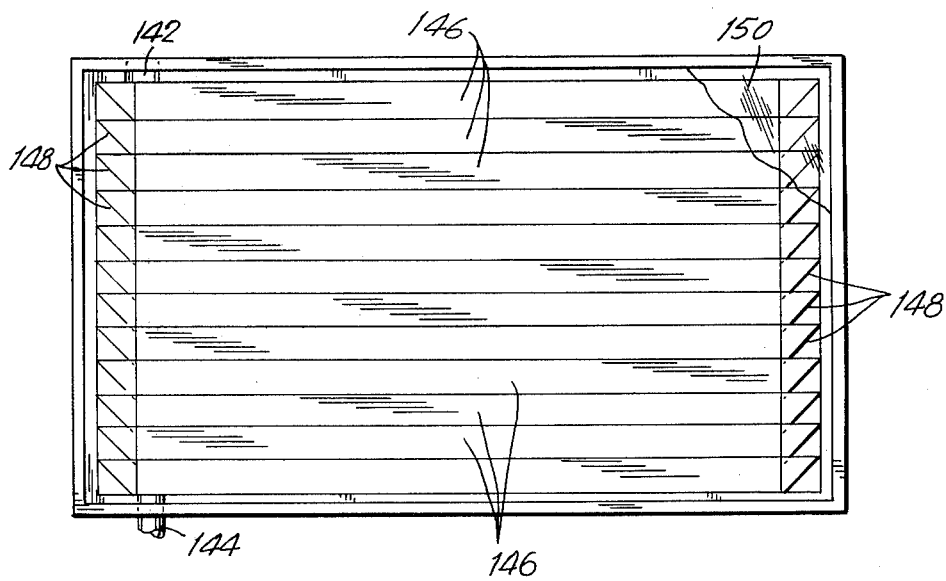
FIG. 21 shows a factory manufactured solar collector panel unit as an alternative embodiment of the invention.
Figure 22:
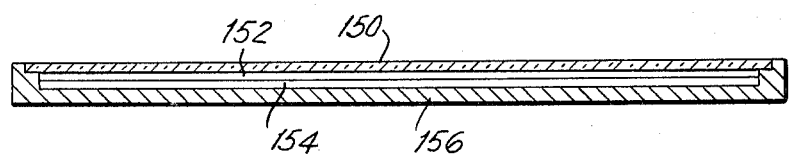
FIG. 22 is an elevation view of the panel of FIG. 21.

FIGS. 21 and 22 show a solar collector panel embodiment of the invention. The integral panel unit is provided with an opening 142 for water to enter, and 144 is a water exit port. The surface of the channels 146 is black. Folded corners 148 are provided. The overall dimension of the panel is 4 feet in height by 8 feet in length. FIG. 22 is a detail showing transparent plastic front panel 150, air gap 152, aluminum channel 154 and insulating support back 156.

FIGS. 23, 24 and 25 show still another alternative embodiment of the invention, namely a solar hot water collector which can be shipped in rolled-up form. Layers 158 and 160 are two layers of flexible transparent plastic which can be rolled up for shipping. End members 162, 164 are top and bottom frame supports, while an air gap 166 for insulation is provided between layers 158 and 160. FIG. 24 shows the notches 168 and 170 for the top and bottom frame supports while 172 designates assembly bolts. The aluminum channels channels 174 can be rolled up around the frame supports; side frame supports 176 are shown, having holes 178 for mounting the assembled collector to a roof. The arrows 180 indicate the flow of water. The lower channel 182 extends below the frame for series ganging. FIG. 25 shows the insulator 158, 160 (or channels 174) rolled up for shipment.

It thus will be seen that there is provided a solar hot water collector which achieves the various objects of the invention and which is well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense. Thus, it will be understood by those skilled in the art that although preferred and alternative embodiments have been shown and described in accordance with the Patent Statutes, the invention is not limited thereto or thereby.

Having thus described the invention, there is claimed as new and desired to be secured by Letters Patent:

1. A solar hot water collector comprising:
   (A) a plurality of substantially rectilinear channels, each channel
      (i) being formed by an elongated strip, said strip being folded longitudinally to form the channel,
      (ii) being composed of a metal having high heat conductivity and selected from the group consisting of aluminum, magnesium, an aluminum-magnesium alloy, steel, copper, brass, and bronze,
      (iii) having a one end and another end,
      (iv) being arranged in approximately parallel relationship on a sloped roof of an enclosure and individually extending transversely to the pitch of the roof and transversely across the roof in a substantially horizontal direction, and
      (v) the ends of the channels being approximately in mutual registration;
   (B) liquid flowable through the channels from said one end of each channel to said other end of each channel under the influence of gravity;
   (C) liquid transfer means at said other end of each channel except the lowermost for transferring the liquid from such channel to the next lower channel solely by gravity;

(D) means for introducing the liquid into the highest channel;

(E) the liquid being heated by the sun as it flows along successive channels;

(F) the channels being both solar heat absorbers and solar heat transmitters, transmitting said heat to the liquid flowing therethrough; and (G) means for removing heated liquid from the lowest channel.

2. The solar hot water collector of claim 1 in which the liquid is water.

3. The solar hot water collector of claim 1 in which the channels are sealed against the outside atmosphere so that they are fluid-impervious.

4. The solar hot water collector of claim 3 in which means is provided to introduce an air stream into the uppermost channel above the liquid, said air stream flowing above the liquid in said channels, together with means to remove a heated air stream from the lowermost channel, all of the channels being connected by lateral gas transfer means, so that the air stream flows successively through all of the channels from the highest channel to the lowest channel.

5. The solar hot water collector of claim 1 in which the channels are composed of anodized aluminum.

6. The solar hot water collector of claim 5 in which the anodized aluminum is provided with a black coating.

7. The solar hot water collector of claim 1 in which the channels are composed of aluminum provided with an external coating of paint.

8. The solar hot water collector of claim 7 in which only one side of each channel is coated with paint, said one side being an external side exposed to the rays of the sun.

9. The solar hot water collector of claim 7 in which the external paint coating is black.

10. A solar hot water collector which comprises an elongated metal strip, said metal strip being composed of a metal having high heat conductivity selected from the group consisting of aluminum, magnesium, an aluminum-magnesium alloy, steel, copper, brass and bronze, said metal strip having a plurality of spaced apart rectilinear slits or slots therein, said slits or slots being longitudinally aligned in tandem along a straight line, a plurality of metal mounting brackets, means mounting said brackets in juxtaposed registration transverse to the longitudinal axis of said metal strip, one end of each mounting bracket extending through one of said slits or slots, means for attaching the other end of each of said brackets to the roof of an enclosure, so that said metal strip extends substantially horizontally across said roof, means for bending each of said brackets into a substantially U-shape, so that said metal strip becomes a U-shaped trough capable of holding a liquid, and means adjacent said one end of each of said brackets for securing said one end of each of said brackets in spaced relation to the other end of the bracket.

11. The solar hot water collector of claim 10 in which the elongated metal strip is in the form of a U-shaped trough having a one end and an other end, said U-shaped trough being one of a plurality of substantially identical and rectilinear U-shaped troughs, said troughs being arranged in approximately parallel relationship on a sloped roof of an enclosure and individually extending transversely to the pitch of said roof and transversely across the roof in a substantially horizontal direction, whereby liquid will flow from the one end of a trough to the other end under the influence of gravity, the ends of said troughs being approximately in mutual registration, liquid transfer means at the other end of each trough except the lowermost for transferring liquid from such trough to the next lower trough solely by gravity, so that liquid will flow from one trough to the next lower adjacent trough under the influence of gravity, means to introduce liquid into the highest trough, said liquid being heated by the sun as it flows along successive troughs, and means to remove heated liquid from the lowest trough.

12. The solar hot water collector of claim 11 in which the liquid is water.

13. The solar hot water collector of claim 10 in which the troughs are sealed against the outside atmosphere so that they are fluid-impervious.

14. The solar hot water collector of claim 13 in which means is provided to introduce an air stream into the uppermost trough above the liquid, said air stream flowing above the liquid in said troughs, together with means to remove a heated air stream from the lowermost trough, all of the troughs being connected by lateral gas transfer means, so that the air stream flows successively through all of the troughs from the highest trough to the lowest trough.

15. The solar hot water collector of claim 10 in which the troughs are composed of anodized aluminum.

16. The solar hot water collector of claim 15 in which the anodized aluminum is provided with a black coating.

17. The solar hot water collector of claim 10 in which the troughs are composed of aluminum provided with an external coating of paint.

18. The solar hot water collector of claim 17 in which the external paint coating is black.

19. The solar hot water collector of claim 17 in which only one side of each trough is coated with paint, said one side being an external side exposed to the rays of the sun.

* * * * *